(12) United States Patent
An et al.

(10) Patent No.: US 10,086,576 B2
(45) Date of Patent: Oct. 2, 2018

(54) APPARATUS FOR FABRICATING LENS, METHOD OF FABRICATING LENS AND LENS

(71) Applicant: LG INNOTEK CO., LTD., Seoul (KR)

(72) Inventors: Myoung Jin An, Seoul (KR); Seung Man Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 272 days.

(21) Appl. No.: 14/417,506

(22) PCT Filed: Nov. 6, 2012

(86) PCT No.: PCT/KR2012/009271
§ 371 (c)(1),
(2) Date: Jan. 26, 2015

(87) PCT Pub. No.: WO2014/017702
PCT Pub. Date: Jan. 30, 2014

(65) Prior Publication Data
US 2015/0251365 A1 Sep. 10, 2015

(30) Foreign Application Priority Data
Jul. 27, 2012 (KR) .................. 10-2012-0082274

(51) Int. Cl.
G02B 7/02 (2006.01)
B29D 11/00 (2006.01)
(Continued)

(52) U.S. Cl.
CPC ........ B29D 11/0048 (2013.01); B29C 45/125 (2013.01); B29C 45/26 (2013.01);
(Continued)

(58) Field of Classification Search
CPC .... B29C 2035/0822; B29C 2035/0827; B29C 2045/2683; B29C 35/02; B29C 35/0888;
(Continued)

(56) References Cited

U.S. PATENT DOCUMENTS 6,693,748 B1 * 2/2004 Fujimoto ............. G02B 3/0025
359/621
9,678,316 B2 * 6/2017 An ........................ B29C 43/021
(Continued)

FOREIGN PATENT DOCUMENTS

| JP | 2002-283399 A | 10/2002 |
|---|---|---|
| KR | 10-2010-0030255 A | 3/2010 |
| WO | 2007/018938 A1 | 2/2007 |

OTHER PUBLICATIONS

Search Report for International Application No. PCT/KR2012/009271.

*Primary Examiner* — Joseph P Martinez
*Assistant Examiner* — Vipin Patel
(74) *Attorney, Agent, or Firm* — LRK Patent Law Firm

(57) ABSTRACT

An apparatus for fabricating a lens includes an injection port to inject a source material, a molding frame filled with the source material and including a plurality of forming molds adjacent to each other, and a light source or a heat source to cure the source material filled in the forming molds. The forming molds include at least four connection passages connected to the forming molds. A method for fabricating a lens includes injecting a source material through an injection port of a molding frame which includes a plurality of forming molds adjacent to each other and at least four connection passages connected to the forming molds, filling the source material in the forming molds and discharging the source material out of the forming molds through the
(Continued)

connection passages, applying a pressure to the source material, and curing the source material.

8 Claims, 6 Drawing Sheets

(51) Int. Cl.
*B29C 45/26* (2006.01)
*B29C 45/12* (2006.01)
*B29C 35/08* (2006.01)
*B29C 35/02* (2006.01)
*B29L 11/00* (2006.01)

(52) U.S. Cl.
CPC .......... *B29D 11/00538* (2013.01); *G02B 7/02* (2013.01); *B29C 35/02* (2013.01); *B29C 35/0888* (2013.01); *B29C 2035/0822* (2013.01); *B29C 2035/0827* (2013.01); *B29C 2045/2683* (2013.01); *B29L 2011/0016* (2013.01)

(58) Field of Classification Search
CPC ......... B29C 45/125; B29C 45/26; G02B 7/02; B29D 11/0048; B29D 11/00538; B29L 2011/0016
See application file for complete search history.

(56) References Cited

U.S. PATENT DOCUMENTS

| | | |
|---|---|---|
| 2003/0207484 A1 | 11/2003 | Nishikawa |
| 2006/0078637 A1 | 4/2006 | Goruganthu et al. |
| 2007/0029277 A1 | 2/2007 | Jacobowitz et al. |
| 2010/0321802 A1* | 12/2010 | Kim ................ B29D 11/00403 359/811 |
| 2011/0075264 A1* | 3/2011 | Chen ................ B29D 11/00009 359/619 |

* cited by examiner

APPARATUS FOR FABRICATING LENS, METHOD OF FABRICATING LENS AND LENS

TECHNICAL FIELD

The embodiment relates to an apparatus for fabricating a lens, a method of fabricating the lens, and a lens.

BACKGROUND ART

Recently, as a mobile appliance such as a cellar phone equipped with a camera has been introduced, still images and moving pictures can be taken regardless of time and location.

In addition, for high-resolution and high-quality photographs, the performance of the camera has been gradually improved, and a camera module having an auto-focusing function, a close-up shot function, and an optical zoom-in/zoom-out function has been mounted.

In order to ensure the performance of the mounted camera module, the size of the camera module must be enlarged.

However, if the camera module, is enlarged, mounting the camera module on the mobile appliance is difficult when taking into consideration the design of the mobile appliance, and the mobile appliance represents the limitation in performance thereof.

Meanwhile, a lens may be fabricated by using an apparatus for fabricating the lens. In other words, the lens may be fabricated by filling a liquid-phase curing material into the lens including lens modules.

When the lens is fabricated, in order to inject the liquid-phase curing material, an injection part used to inject the liquid-phase curing material and a discharge part used to discharge the liquid-phase curing material are connected to each, lens, module.

A curing process is performed after the liquid-phase curing material has been injected or discharged through the injection part and the discharge part. When the curing process is performed, the injection and discharge parts are not cured, but only the liquid-phase curing material filled in the lens module is cured.

In this case, the phase of the liquid-phase curing resin filled in the lens module is changed from a liquid phase to a solid phase, so that the liquid-phase curing resin may be contracted. The liquid phase-curing resin filled in the injection and discharge parts, which are not cured, may be filled in the contracted part. Accordingly, when the lens is fabricated, a de-center phenomenon may occur.

The de-center phenomenon occurs when the center of one curved surface of a lens is mismatched with the center of the other curved surface of the lens. Accordingly, the performance of the lens may be degraded. In other words, even though the center of the top surface of the lens must be aligned in line with the center of the bottom surface of the lens, when the upper and lower portions of the lens are cured at different speeds in the step of curing the lens by irradiating light or heat in the middle of a molding process for the lens, or the shape of the lens module is erroneously formed, the upper portion of the lens may be offset from the lower portion of the lens, so that the performance of the lens may be degraded.

Therefore, an apparatus for fabricating a lens, a method of fabricating the lens, and the lens, which can reduce and/or prevent the de-center phenomenon when the lens is fabricated, have been required.

DISCLOSURE

Technical Problem

The embodiment provides a lens capable of preventing a de-center phenomenon when the lens is fabricated and a method of fabricating the same.

Technical Solution

According to the embodiment, there is provided an apparatus for fabricating a lens, which includes an injection port to inject a source material, a molding frame filled with the source material and including a plurality of forming molds adjacent to each other, and a light source or a heat source to cure the source material filled in the forming molds. The forming molds include at least four connection passages connected to the forming molds.

According to the embodiment, there is provided a method of fabricating the lens, which includes injecting a source material through an injection port of a molding frame which includes a plurality of forming molds adjacent to each other and at least four connection passages connected to the forming molds, filling the source material in the forming molds and discharging the source material out of the forming molds through the connection passages, applying a pressure to the source material, and curing the source material.

According to the embodiment, there is provided the lens which includes a lens part having a curved surface, and a support part extending from the lens part. The support part includes at least four cutting surfaces.

Advantageous Effects

As described above, the lens, which is fabricated through the apparatus and method of fabricating the lens according to the embodiment, may include a support part having at least four cutting surfaces. In other words, the lens includes the support part formed therein with four cutting surfaces. In addition, the cutting surfaces are formed at the top, bottom, left, and right, so that the cutting surfaces correspond to each other. Accordingly, the extension line from the top to the bottom can be perpendicular to the extension line from the left to the right.

Therefore, according to the lens of the embodiment, the moving error caused by the contraction of the curable resin composition in the middle of fabricating the lens according to the embodiment can be reduced. In other words, since the connection passages are formed at the surfaces symmetric to each other, even if the movement occurs in each direction, the movements can be canceled from each other. Accordingly, the geometric errors in zero and right angle directions can be reduced. Therefore, the efficiency and the performance of the lens can be improved.

In addition, according to the apparatus of fabricating the lens and the method of fabricating the lens of the embodiment, the forming molds and the connection passages forming the shape of a mesh are provided in the molding frame, and the curable resin composition is filled in the molding frame, thereby fabricating the lens array, substrate and then cutting the lens array to produce lenses. Accordingly, the mass production of the lenses can be achieved.

Further, according to the apparatus of fabricating the lens and the method of fabricating the lens of the embodiment, the curable resin composition is filled in the forming molds through the connection passages. In other words, at least four connection passages are connected to the forming grooves, and the curable resin composition is more uniformly distributed and filled in the forming grooves through the connection passages, so that the product yield of the lens can be improved when fabricating the lens.

In addition, according to the apparatus of fabricating the lens and the method of fabricating the lens of the embodiment, the curable resin composition is uniformly filled in the forming molds through the connection passages and cured, so that the de-center phenomenon can be reduced.

In addition, according to the embodiment, when the lens is applied to a camera module, the limitation to the shape of the lens can be reduced.

MODE FOR INVENTION

Figure 1:
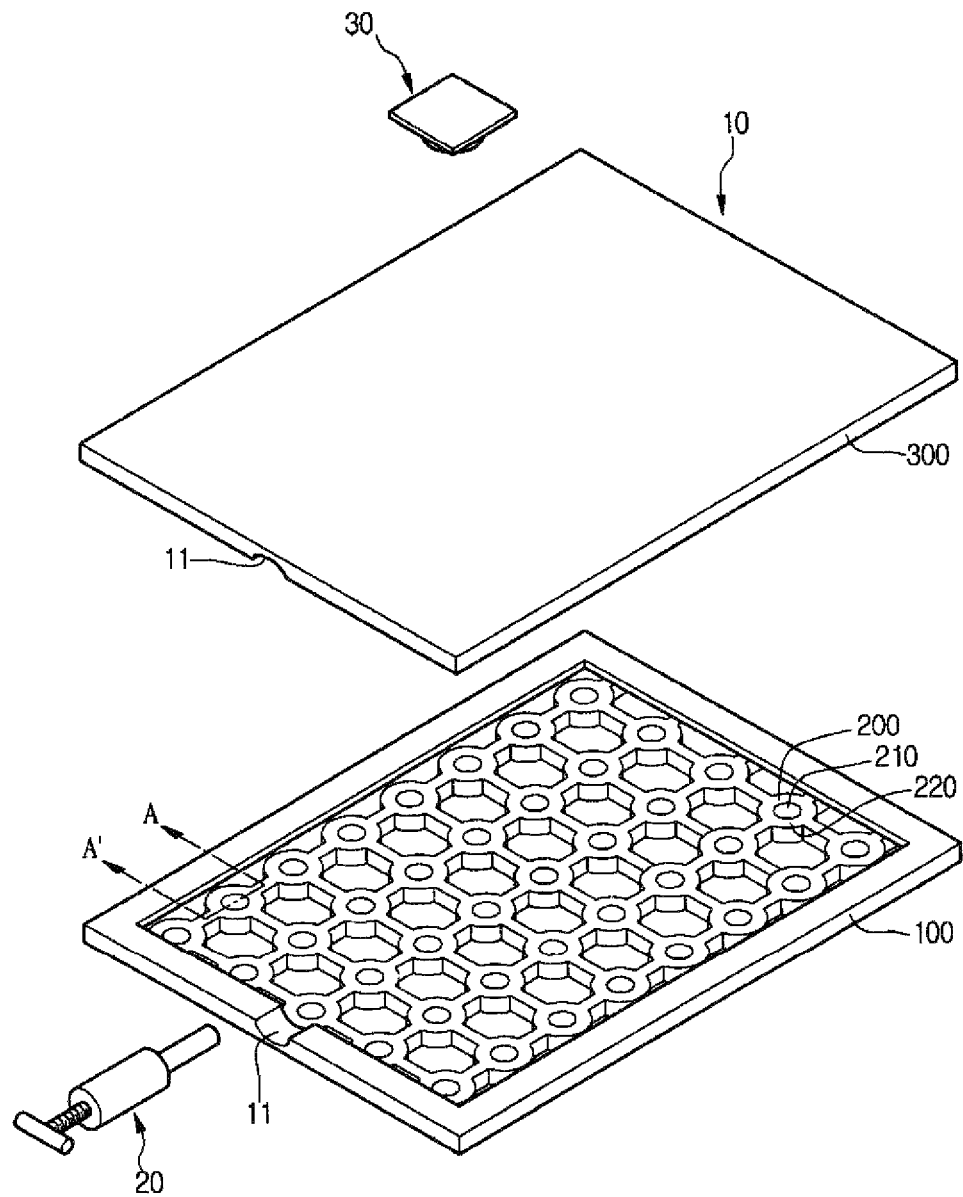
FIG. 1 is an exploded perspective view showing an apparatus for fabricating a lens according to the embodiment.

In the description of the embodiments, it will be understood that, when a lens, a unit, a part, a hole, a protrusion, a groove, or a layer is referred to as being "on" or "under" another lens, another unit, another part, another hole, another protrusion, another groove, or another layer, it can be "directly" or over the other lens, the other unit, the other part, the other hole, the other protrusion, the other groove, or the other layer, or one or more intervening layers may also be present. In addition, the positions of each component will be described with reference to accompanying drawings. Since the thickness and size of each component shown in the drawings may be modified for the purpose of convenience or clarity of description, the size of elements does not utterly reflect an actual size.

Figure 2:
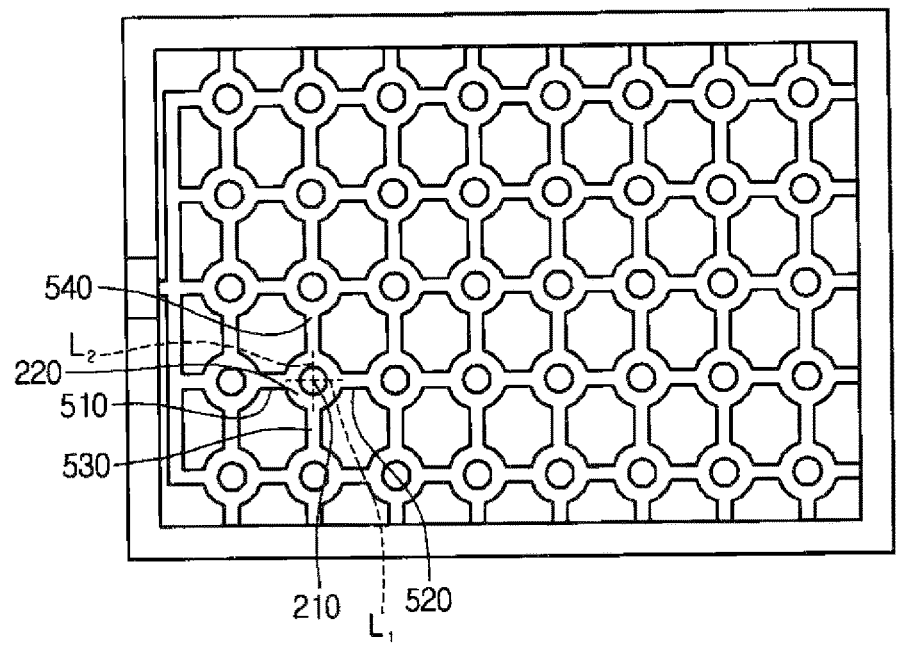
FIG. 2 is a view showing a lower molding frame and a lower forming mold according to the embodiment.
Figure 3:
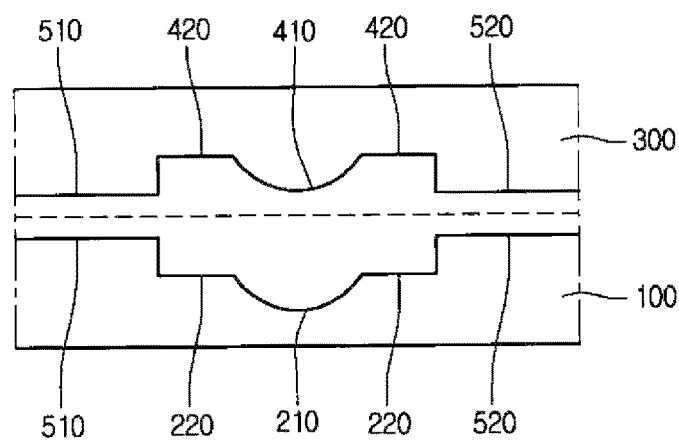
FIG. 3 is a sectional view taken along line A-A' of FIG. 1.
Figure 4:
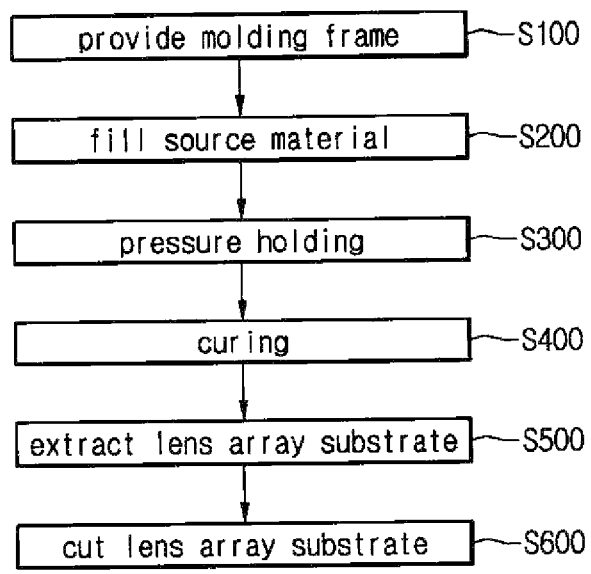
FIG. 4 is a flowchart showing a method of fabricating the lens according to the embodiment.
Figure 5:
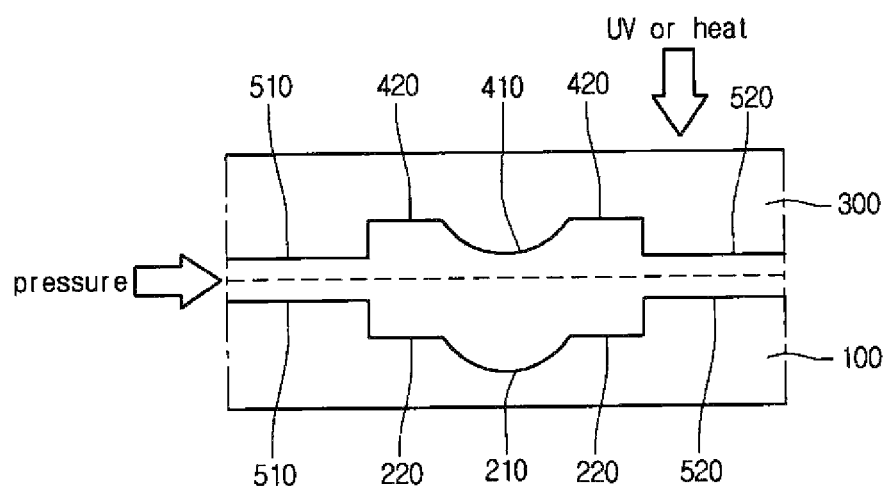
FIG. 5 is a view showing a curing step and a pressure holding step.
Figure 6:
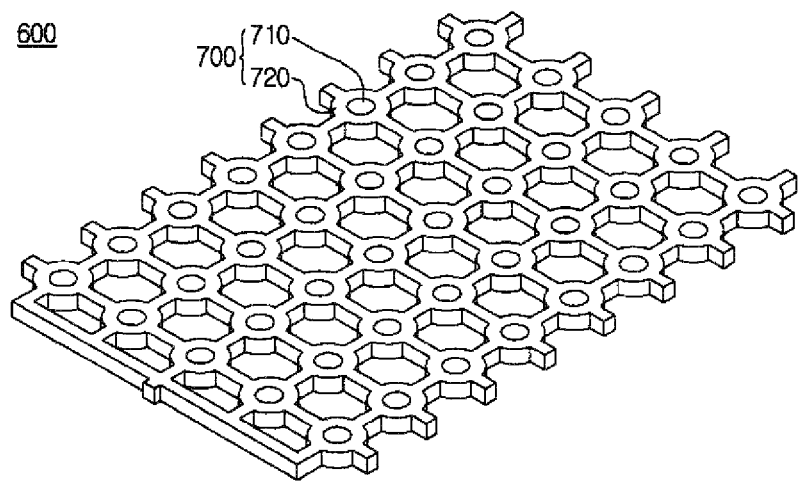
FIG. 6 is a perspective view showing a lens array substrate fabricated through a method of fabricating the lens according to the embodiment.
Figure 7:
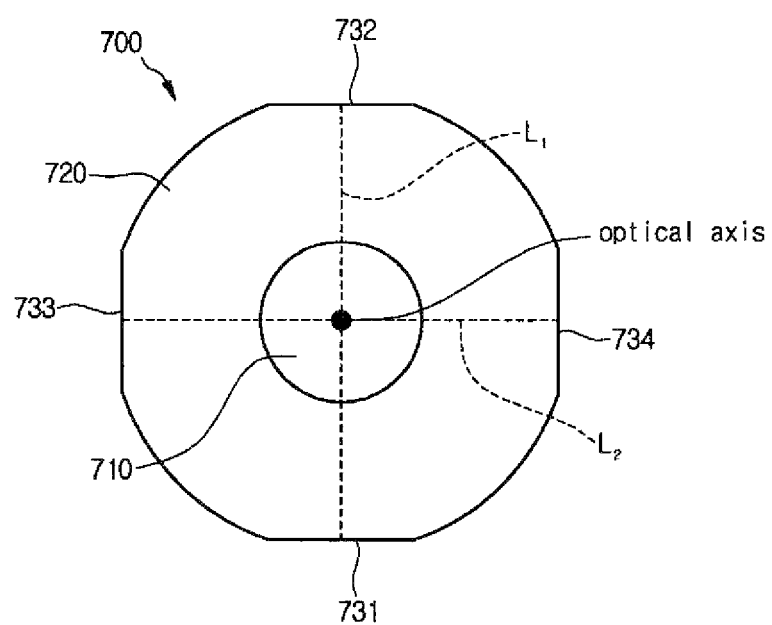
FIG. 7 is a view showing a lens according to the embodiment.
Figure 8:
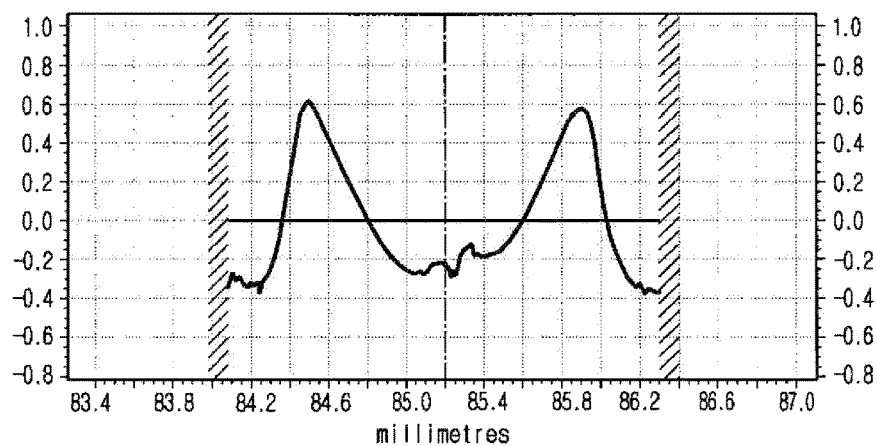
FIGS. 8 and 9 are graphs showing the geometric errors of a lens fabricated according to comparative examples.
Figure 9:
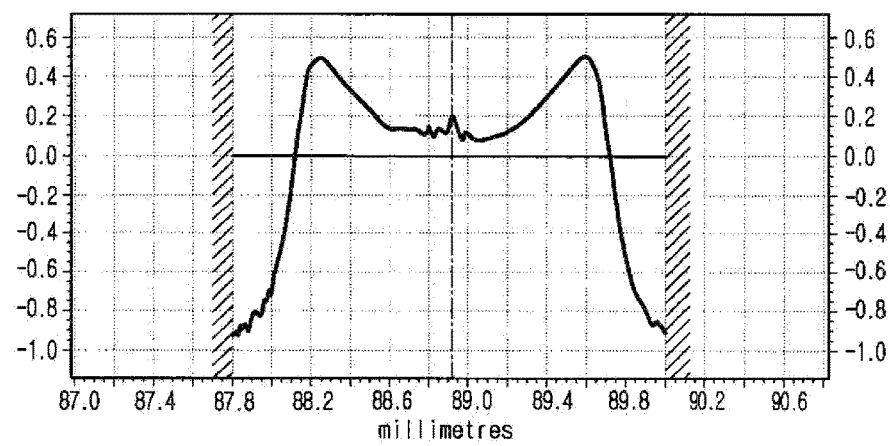
Figure 10:
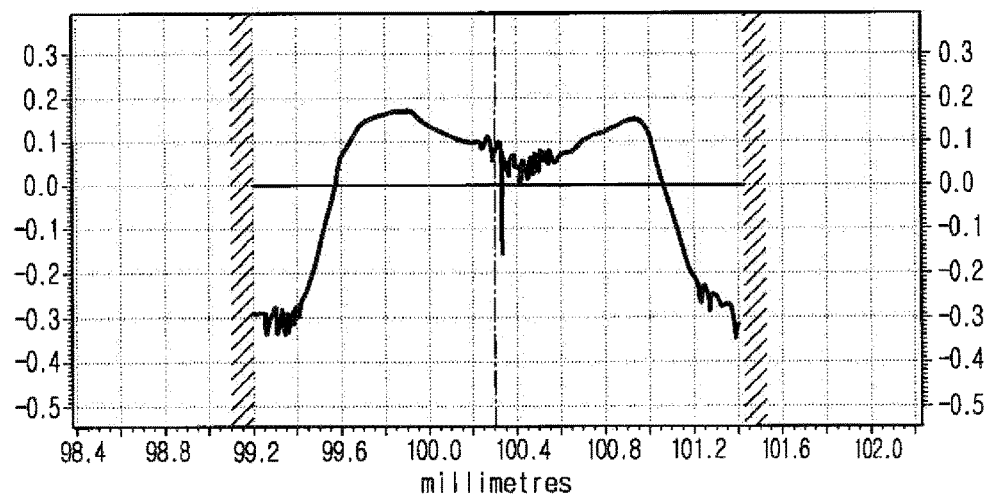
FIGS. 10 and 11 are graphs showing the geometric errors of a lens fabricated according to the embodiment.
Figure 11:
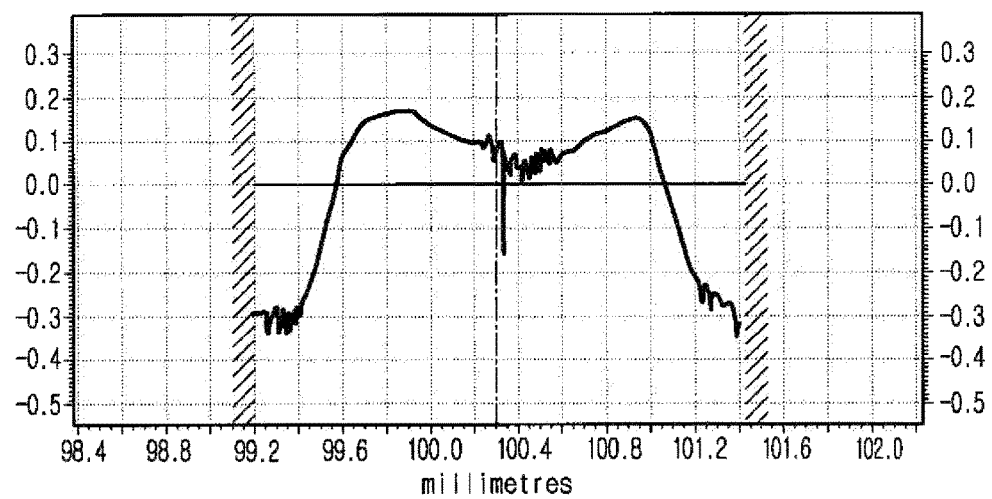

FIG. 1 is an exploded perspective view showing an apparatus for fabricating a lens according to the embodiment, FIG. 2 is a view showing a lower molding frame and a lower forming mold according to the embodiment, and FIG. 3 is a sectional view taken along line A-A' of FIG. 1. FIG. 4 is a flowchart showing a method of fabricating the lens according to the embodiment, FIG. 5 is a view showing a curing step and a pressure holding step, and FIG. 6 is a perspective view showing a lens array substrate fabricated through a method of fabricating the lens according to the embodiment. FIG. 7 is a view showing a lens according to the embodiment, and FIGS. 8 and 9 are graphs showing the geometric errors of a lens fabricated according to comparative examples. FIGS. 10 and 11 are graphs showing the geometric errors of a lens fabricated according to the embodiment.

Hereinafter, an apparatus for fabricating a lens according to the embodiment will be described with reference to FIGS. 1 to 3.

Referring to FIGS. 1 to 3, the apparatus for fabricating the lens according to the embodiment includes a molding frame 10, a pressure holding device 20, and a generator 30 to generate light or heat.

A portion or an entire portion of the molding frame 10 is transparent. The molding frame 10 includes a lower molding frame 100, lower forming molds 200, an upper molding frame 300, and upper forming, molds (not shown).

The molding frame 10 includes the lower molding frame 100 and the upper molding frame 300. In other words, the molding frame 10 may be formed by integrally coupling the lower molding frame 100 with the upper molding frame 300. In addition, the molding frame 10 includes an injection port 11 used to inject a source material.

The lower molding frame 100 is coupled with the upper molding frame 300. In addition, the lower molding frame 100 has a shape symmetric to that of the upper molding frame 300.

The lower molding frame 100 has the shape of a rectangular frame having an open upper portion. The lower molding frame 100 is transparent or opaque. The lower molding frame 100 may include a material such as metal, glass, or plastic.

The lower forming molds 200 are provided inside the lower molding frame 100. In more detail, the lower molding molds 200 are arranged in the shape of a mesh inside the lower molding frame 100. The lower molding molds 200 are opaque or transparent. The lower molding molds 200 may include a material such as metal, glass, or plastic. Each lower molding mold 200 includes a forming groove 210 and a forming body 220 surrounding the forming groove 210. The forming groove 210 may include a circular groove. The forming groove 210 is integrally formed with the forming body 220.

The lower molding frame 100 may be integrally formed with the lower forming molds 200. In addition, the lower forming molds 200 may be integrally formed with each other.

Referring to FIGS. 1 and 2, each lower forming mold 200 includes a plurality of connection passages. In other words, the connection passages may be connected to each other in each lower forming mold 200.

The connection passages may connect the lower forming molds 200 to each other. In other words, the lower forming molds 200 are connected to each other through the connection passages, so that the lower forming molds 200 may be integrally formed with each other.

In detail, each lower forming mold 200 may include at least four connection passages. For example, each lower forming mold 200 includes four connection passages. In other words, the connection passage includes first to fourth connection passages 510 to 540.

The first to fourth connection passages 510 to 540 may be connected to any one surface of each lower forming mold 200. In detail, the first to fourth connection passages 510 to 540 may be connected to each other in such a manner that the positions of the first and second connection passages 510 and 520 correspond to each other, and the positions of the third and fourth connection passages 530 and 540 correspond to each other. In more detail, a first extension line L1 extending from the first connection passage 510 to the second connection passage 520 may be perpendicular to a second extension line L2 extending from the third connection passage 530 to the fourth connection passage 540. In other words, the first and second extension lines L1 and L2 may have the shape of "+".

The upper molding frame 300 may have a shape corresponding to that of the lower molding frame 100. In other words, the upper molding frame 300 includes upper forming molds having the same shape and the same size as those of the lower molding frame 100. Each upper forming mold includes an upper forming groove 410 and an upper forming body 420. In addition, the upper forming molds are connected to each other through the first to fourth connection passages 510 to 540, so that the upper forming molds, may be integrally formed with each other.

In other words, the description of the upper molding frame 300 and the upper forming mold will be essentially incorporated in the description of the lower molding frame 100 and the lower forming mold 200.

Referring to FIG. 3, the lower molding frame 100 and the upper molding frame 300 may be integrally formed with each other. A sealing member (not shown) may be further provided between the lower and upper molding frames 100 and 300 to seal the space between the lower and upper molding frames 100 and 300.

The lower molding frame 100 is integrally coupled with the upper molding frame 300. If a source material is filled through the injection part, the source material may be filled in the forming grooves 210 and 410 through the connection passages (see 510 to 540, not shown). In other words, the source material is filled in the forming grooves through the connection passages, and then moved into other adjacent forming grooves through the connection passages, so that the source material may be filled in other forming grooves.

Hereinafter, a method of fabricating the lens according to the embodiment will be described with reference to FIGS. 4 to 6.

Referring to FIG. 4, the lens is fabricated through the following processes by the apparatus for fabricating the lens according to the embodiment.

First, the lower and upper molding frames 100 and 200 are coupled with each other by a coupling unit (step S100).

Thereafter, a source material is injected into the lower and upper molding frames 100 and 200 (step S200).

The source material may include a curable resin composition. The curable resin composition may include a heat-curable resin composition or a photo-curable resin composition.

The heat-curable resin composition or the photo-curable resin composition may be formed by mixing a curable monomer and a thermosetting, initiator.

A photo-curable monomer and a heat-curable monomer may include various monomers generally known to those skilled in the art, or may include the mixture of various monomers.

The photo-curable monomer may include 2-butoxyethyl acrylate, ethylene glycol phenyl ether acrylate, 2-butoxyethyl methacrylate, ethylene glyco phenyl ether methacrylate, 2-hydorxyethyl methacrylate, isodecyl methacrylate, phenyl methacrylate, bisphenol A propoxylate diacrylate, 1,3(1,4)-butanediol diacrylate, 1,6-hexandiol ethoxylate diacrylate, neophenyl glycol diacrylate, ethylene glycol diacrylate, di-(ethylene glycol) diacrylate, tetra ethylene glycol diacrylate, 1,3(1,4)-butanediol dimethacrylate, diurethane dimethacrylate, grycerol dimethacrylate, ethylene glycol dimethacrylate, di-(ethylene glycol) dimethacrylate, tri(ethylene glycol) dimethacrylate, 1,6-hexandiol dimethacrylate, glycerol propoxylate triaicrylate, pentaerythritol propoxylate triacrylate, ditrimetylolpropane tetra-acrylate and pentaerythritol tetra-acrylate.

The photo-curable initiator may include α-hydroxyketone, phenylglyoxylate, benzildimethyl ketal, α-aminoketone, mono acyl phosphine, bis acyl phosphine, 2,2-dimethoxy-2-phenylacetophenone, and the compound thereof.

The photo-curable initiator may include 2,2-azobis(isobutyronitrile).

The photo-curable initiator or the thermosetting initiator are materials decomposed into radicals through the irradiation of ultraviolet light or heat thereon to initiate cross-linking and curing reactions of the photo-curable resin composition or the thermosetting resin composition. The photo-curable initiator or the thermosetting initiator is adjustably selected in the type and the contents thereof by taking into consideration the curing reaction speed of the resin composition, a discoloration characteristic, and the attachment degree to a base. If necessary, at least two of curable initiators may be mixed with each other for the use.

The photo-curable initiator and/or the thermosetting initiator may be mixed with the content of about 0.1 w/t % to about 0.3 wt % based on the resin composition.

The curable resin composition injected between the lower molding frame 100 and the upper molding frame 300 may be filled in the forming molds through the connection passages. Preferably, the photo-curable resin composition may be filled in the forming grooves of the forming molds.

For example, as shown in FIG. 2, the connection passages include the first to fourth connection passages 510 to 540. In addition, the curable resin composition is filled in the forming molds through the first connection passages. Then, the source material is filled in the forming molds and discharged out of the forming molds through the second to fourth connection passages. However, the embodiment is not limited thereto, and the filling and the discharging of the curable resin composition can be simultaneously performed through the first to fourth connection passages 510 to 540.

As shown in FIG. 5, pressure is applied to the curable resin composition by the pressure holding device 20 (step S300). Thereafter, ultraviolet light or heat is applied to the curable resin composition through the upper molding frame 300 (step S400).

In addition, while ultraviolet light or heat is irradiated on the photo-curable resin composition, the pressure of about 6000 psi to about 15000 psi may be applied to the curable resin composition through the injection port 11.

In other words, the curing step S400 and the pressure holding step S300 are simultaneously performed.

Since the upper molding frame 300 is transparent, the ultraviolet light can be easily irradiated to the photo-curable resin composition when the photo-curable resin composition is used. The ultraviolet light is irradiated with the intensity of about 1.5 mW/cm$^2$ to 5.5 mW/cm$^2$ for about 18 minutes, to about 23 minutes. In addition, the intensity of the ultraviolet light or heat and the irradiation time may be varied according to the types of the photo-curable resin composition.

In addition, during the curing step S400, the intensity of the ultraviolet light or the intensity of heat applied to the curable resin composition may be varied according to the time.

For example, in the curing step S400, when the ultraviolet light is irradiated, the intensity of the ultraviolet light irradiated onto the photo-curable resin composition is 1.5 mW/cm$^2$ for about 5 minutes to 10 minutes. Thereafter, the intensity of the ultraviolet light is about 3.5 mW/cm$^2$ for about 5 minutes to about 10 minutes, and then the intensity of the ultraviolet light may be 5.5 mW/cu for about 2 minutes to about 5 minutes.

Further, the pressure holding step S300 may be performed in the middle of curing the curable resin composition.

In addition, during the pressure holding step S300, the pressure applied to the curable resin composition may be varied with the lapse of time.

For example, in the pressure holding step S300, pressure having the intensity of 15000 psi is applied to the curable resin composition for about 10 minutes to about 15 minutes. Thereafter, pressure having the intensity of 10000 psi is applied to the curable resin composition for about 5 minutes to about 10 minutes, and then pressure having the intensity of 500 psi is applied to the curable resin composition for about 2 minutes to about 5 minutes.

In addition, as the pressure holding step S300 is performed, the pressure applied to the curable resin composition may be gradually increased, gradually decreased, or gradually decreased after the pressure has been increased with the lapse of time.

Alternatively, the pressure holding step S300 may be performed after the curing step S400 has been performed.

In addition, a primary pressure holding step may be performed before the curing step S400 is performed, and the curing step and a secondary pressure holding step may be simultaneously performed. In other words, in the state that the pressure applied to the curable resin composition is increased, the ultraviolet light or heat may be irradiated onto the curable resin composition. Through the above procedures, the curable resin composition is cured by the ultraviolet light or heat.

Thereafter, the upper molding, frame 300 is open, and a lens array substrate 600 formed inside the lower molding frame 200 is extracted from the upper molding frame 300 (step S500).

Referring to FIG. 6, the lens array substrate 600 includes a plurality of lens 700 connected to each other through the connection passages of the lens array substrate 600.

Then, after the lens array substrate 600 has been cut, and the connection passages have been cut, the lenses 700 are formed (step S600).

Hereinafter, the lenses 700 according to the embodiment will be described with reference to FIG. 7

Referring to FIG. 7, the lens 700 according to the embodiment includes a lens part 710 having a curved surface and a support part 720 extending from the lens part 710. In addition, the support part 720 includes at least four cutting surfaces. In addition, the cutting surfaces may include flat surfaces.

For example, the support part 720 may include four cutting surfaces. In other words, the support part 720 may include a first cutting surface 731, a second cutting surface 732, a third cutting surface 733, and a fourth cutting surface 734.

The first to fourth cutting surfaces 731 to 734 may be formed by removing connection passages connected to the lens module during the fabricating process of the lens.

The positions of the first and second cutting surfaces 731 and 732 may correspond to each other. In addition, the positions of the third and fourth cutting surfaces 733 and 734 may correspond to each other. For example, a first extension line L1 extending from the first cutting surface 731 to the second cutting surface 732 may be perpendicular to a second extension line L2 extending from the third cutting surface 733 to the fourth cutting surface 734.

In other words, the first extension line L1 and the second extension line L2 may cross each other at the optical axis of the lens part, and may have the shape of "+".

The lens, which is fabricated through the apparatus for fabricating the lens according to the embodiment, and the method of fabricating the lens, may include a support part having at least four cutting surfaces. In other words, the lens includes the support part formed therein with four cutting surfaces. In addition, the cutting surfaces are formed at the top, bottom, left, and right, so that the cutting surfaces correspond to each other. Accordingly, the extension line from the top to the bottom may be perpendicular to the extension line from the left to the right.

Therefore, according to the lens of the embodiment, moving error caused by the contraction of the curable resin composition in the middle of fabricating the lens according to the embodiment can be reduced. In other words, since the connection passages are formed at the surfaces symmetric to each other, even if the movement occurs in each direction, the movements can be canceled. Accordingly, the geometric errors in zero and right angle directions can be reduced. Therefore, the efficiency and the performance of the lens can be improved.

In addition, according to the apparatus of fabricating the lens and the method of fabricating the lens of the embodiment, the forming molds and the connection passages forming the shape of, a mesh are provided in the molding frame, and the curable resin composition is filled in the molding frame, thereby fabricating the lens array substrate and then cutting the lens array to produce lenses. Accordingly, the mass production of the lenses can be achieved.

Further, according to the apparatus of fabricating the lens and the method of fabricating the lens of the embodiment, the curable resin composition is filled in the forming molds through the connection passages. In other words, at least four connection passages are connected to the forming grooves, and the curable resin composition is more uniformly distributed and filled in the forming grooves through the connection passages, so that the product yield of the lens can be improved when fabricating the lens.

In addition, according to the apparatus of fabricating the lens and the method of fabricating the lens of the embodiment, the curable resin composition is uniformly filled in the forming molds through the connection passages and cured, so that the de-center phenomenon can be reduced.

In addition, according to the embodiment, when the lens is applied to a camera module, the limitation to the shape of the lens can be reduced.

Hereinafter, the disclosure will be more described in detail through lenses according to the embodiments and comparative examples. The embodiments are provided only for the illustrative purpose. Accordingly, the disclosure is not limited to the embodiments.

Embodiment

After injecting a curable resin composition into an injection part through an apparatus for fabricating a lens, in which each forming mold includes four connection passages, and pressing and curing the curable resin composition, a lens array substrate is extracted. Thereafter, lenses are fabricated by removing the lens array substrate and four connection passages.

Comparative Example

Lenses according to the comparative example is fabricated in the same manner as that of the lenses according to the embodiment except that the lenses are fabricated through an apparatus for fabricating a lens including forming molds having two connection passage.

TABLE 1

|  | 0° geometric error | 90° geometric error |
|---|---|---|
| Embodiment | 0.5822 μm | 0.5648 μm |
| Comparative Example | 1.0258 μm | 1.4899 μm |

Referring to Table 1, and FIGS. 8 to 11, the lens according to the embodiment represents a slight difference between 0° and 90° geometric errors.

In other words, according to the embodiment, the lens is formed therein with the third and fourth cutting surfaces positioned, at the angle of 90° with respect to the first and second cutting surfaces positioned at the angle of 0°, so that the movement of the first and second cutting surfaces caused by the contraction can be, compensated. In other words, since even both of the third and fourth cutting surfaces are simultaneously moved due to the contraction, the geometric errors caused by the contraction occurring at the first and second cutting surfaces may be reduced.

Therefore, the efficiency of the lens fabricated through the apparatus for fabricating the lens and the method of fabricating the lens of the embodiment can be improved, so that the de-center phenomenon can be reduced.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An apparatus for fabricating a lens, the apparatus comprising:
an injection port to inject a source material;
a molding frame filled with the source material and including a plurality of forming molds adjacent to each other; and
a light source or a heat source to cure the source material filled in the forming molds;
a pressure, holding part to increase an internal pressure of the molding frame; and
a press part to increase the internal pressure of the molding frame by applying a pressure to the molding frame,
wherein each of the forming molds includes a forming groove, a forming body surrounding the forming groove, and at least four connection passages,
wherein the at least four connection passages include:
a first connection passage formed at a first outside portion of the forming body;
a second connection passage formed at a second outside portion of the forming body and separated from the first connection passage;
a third connection passage formed at a third outside portion of the forming body and separated from the first connection passage and the second connection passage; and
a fourth connection passage formed, at a fourth outside portion of the forming body and separated from the first connection passage to the third connection, passage,
wherein the first connection passage has a shape symmetric to that of the second connection passage based on the forming body,
wherein the third connection passage has a shape symmetric to that of the fourth connection passage based on the forming body,
wherein the forming body includes:
a fifth outside portion between the first outside portion and the third outside portion, and having a curved surface;
a sixth outside portion between the second outside portion and the third outside portion, and having a curved surface;
a seventh outside portion between the second outside portion and the fourth outside portion, and having a curved surface; and
an eighth outside portion between the first outside portion and the fourth outside portion, and having a curved surface,
wherein the fifth outside portion to the eighth outside portion are separated from the first connection passage to the fourth connection passage, and
wherein the first connection passage to the four connection passage are only connected through the forming groove to each other.

2. The apparatus of claim 1, wherein a first extension line extending from the first connection passage to the second connection passage is mutually perpendicular to a second extension line extending from the third connection passage to the fourth connection passage.

3. The apparatus of claim 1, wherein the forming groove is integrally formed with the forming body.

4. The apparatus of claim 1, wherein the forming body is integrally formed with the first connection passage to the fourth connection passage.

5. A method of fabricating a lens, the method comprising:
injecting a source material through an injection port of a molding frame which includes a plurality of forming molds adjacent to each other and at least four connection passages connected to the forming molds;
filling the source material in the forming molds and discharging the source material out of the forming molds through the at least four connection passages;
applying a pressure to the source material; and
curing the source material,
wherein each of the forming molds includes a forming groove, a forming body surrounding the forming groove, and the at least four connection passages connected to the forming body,
wherein the at least four connection passages include:
a first connection passage formed at a first outside portion of the forming body;
a second connection passage formed at a second outside portion of the forming body and separated from the first connection passage;
a third connection passage formed at a third outside portion of the forming body and separated from the first connection passage and the second connection passage; and
a fourth connection passage formed at a fourth outside portion of the forming body and separated from the first connection passage to the third connection passage, wherein the first connection passage has a shape symmetric to that of the second connection passage based on the forming body,
wherein the third connection passage has a shape symmetric to that of the fourth connection passage based on the forming body,
wherein the forming body includes:
- a fifth outside portion between the first outside portion and the third outside portion, and having a curved surface;
- a sixth outside portion between the second outside portion and the third outside portion, and having a curved surface;
- a seventh outside portion between the second outside portion and the fourth outside portion, and having a curved surface; and
- an eighth outside portion between the first outside portion and the fourth outside portion, and having a curved surface, wherein the fifth outside portion to the eighth outside portion are separated from the first connection passage to the fourth connection passage, and wherein the first connection passage to the four connection passage are only connected through the forming groove to each other.

6. The method of claim 5, wherein the filling of the source material in the forming molds and the discharging of the source material out of the forming molds through the at least four, connection passages comprises:
- filling the source material in the forming mold and discharging the source material out of the forming mold through the first connection passage; and
- filling the source material in remaining forming molds and discharging the source material out of the remaining forming molds through the second to fourth connection passages.

7. The method of claim 6, wherein the source material includes a photo-curable resin composition or a thermosetting resin composition.

8. The method of claim 5, further comprising removing the first to fourth connection passages connected to the forming molds.

* * * * *